3,121,461
HIGH-PRESSURE VAPORIZATION PROCESS OF SECONDARY RECOVERY OF HYDROCARBON OIL
Lorld G. Sharp, Irving, Tex., assignor to Socony Mobil Oil Company, Inc., a corporation of New York
No Drawing. Filed Dec. 6, 1960, Ser. No. 73,967
12 Claims. (Cl. 166—9)

This invention relates generally to the field of secondary recovery of hydrocarbon oil from subterranean reservoirs. More specifically, this invention relates to an improved method of carrying out a high-pressure vaporization process for the secondary recovery of oil.

Upon initial completion of the development of a hydrocarbon oil-bearing subterranean reservoir by the drilling of one or more wells into the reservoir, oil is generally produced by utilization of native reservoir energy which forces the oil to the surface through the well or wells. Employment of native reservoir energy to produce the oil is most generally referred to under the category of primary production. Primary production comprises water drive, gas-cap drive, solution-gas drive, or combinations thereof. Oftentimes a subterranean reservoir will contain a combination of oil and gas which exists at a sufficiently high initial pressure that the gas is dissolved in or in solution with the oil. When the reservoir is penetrated by one or more wells and the pressure existing within the reservoir is relieved through the wells, the pressure of the gas in solution within the oil forces the oil through the wells to the surface. This type of oil production is of the primary form known as "solution-gas drive." During the process of producing oil by solution-gas drive, the reservoir pressure is gradually depleted and, thus, will eventually arrive at a pressure at which the gas dissolved in the oil will start forming bubbles of free gas and thus coming out of solution with the oil. The pressure at which the first bubble of free gas appears in the oil and comes out of solution is commonly referred to as the "bubble point" for that particular hydrocarbon system. For example, the original pressure in a reservoir may be 5000 p.s.i., while the bubble point pressure may be on the order of 3000 p.s.i. Once a reservoir is produced down to and below the bubble point, the bubbles of free gas which separate from the reservoir oil begin forming bodies of free gas within the reservoir. Thus, at the bubble point, free-gas saturation of the reservoir begins and the reservoir develops zones which are oil-filled and zones which are gas-filled. While a reservoir may be produced by solution-gas drive below the bubble point, it will be readily recognized that the pressure of the reservoir will continue to deplete and the free-gas saturation of the reservoir will continue to increase.

It is well known that primary production methods often leave large quantities of oil within a reservoir. When it is no longer economically feasible to produce a reservoir by primary production methods, it is necessary, if further oil is to be recovered from the reservoir, to resort to what are commonly referred to as secondary recovery methods to achieve further oil production. Among the many methods of secondary recovery of oil which have been suggested and are currently being employed is one which is referred to as a "high-pressure vaporization process."

The high-pressure vaporization process of secondary recovery of oil from a reservoir is a method of in-situ development of a body of miscible material which is driven through the reservoir for the purpose of displacing the reservoir oil to a production well or wells. In carrying out a high-pressure vaporization process, a material such as a gas containing a large amount of methane is introduced into a reservoir through one or more production wells at a pressure which normally will be above about 3000 pounds per square inch. As the gas enters the reservoir it comes in contact with the reservoir oil, and due to its relatively high pressure the gas in part goes into solution with the oil and also vaporizes low-boiling hydrocarbons or intermediates from the oil; and, when the gas has vaporized a sufficient quantity of the low-boiling hydrocarbons and has thereby become enriched, it will arrive at a point of enrichment where it becomes miscible with the reservoir fluids. Also, the enriched phase is miscible with the gas which is being introduced and thus there is formed a phase between the injected gas and the oil which permits driving the oil through the formation to a production well or wells. The particular high-pressure vaporization process with which the present invention is concerned most closely resembles the "M front" process which is described in an article entitled "High-Pressure Gas Injection—Mechanism of Recovery Increase" in Drilling and Production Practices, 1953, published by the American Petroleum Institute. The "M front" process is also disclosed in U.S. Patent 2,724,438 to L. P. Wharton et al.

High-pressure vaporization processes, as presently known and employed, while effective under the proper conditions, have serious drawbacks when applied to a reservoir which has been produced by solution-gas drive down to a pressure which is below the bubble point of the hydrocarbon system of the reservoir. High-pressure gas vaporization processes become largely ineffective when applied to a reservoir which has been produced below the bubble point. As previously mentioned, when a reservoir has been produced below its bubble point, large quantities of free gas develop within the reservoir and thus the reservoir develops zones which are filled with free gas and are therefore highly permeable to gas. Such a reservoir is said to have a high gas saturation. When the gas employed in a high-pressure vaporization process is introduced into such a reservoir, it will immediately seek the paths of least resistance, which are those paths through the portions of the reservoir which are gas-saturated, with the result that the injected gas tends to by-pass the reservoir oil. While a bank of enriched gas will eventually be built up, during the process of its being formed much of the reservoir oil will be by-passed and consequently not produced. The high-pressure gas may move outwardly from the injection well as much as 300 feet before the desired miscible phase is developed. It may therefore be readily seen that the presently employed methods of high-pressure vaporization for secondary recovery are most efficiently carried out only when applied to a reservoir which has not been produced to a pressure below the bubble point for the hydrocarbon system within that particular reservoir.

It is one object of the present invention to provide a process of the secondary recovery type for the production of oil from a reservoir. It is another object of the present invention to provide an improved form of high-pressure vaporization process which may be employed in the recovery of oil from a reservoir which has been produced by solution-gas drive below the bubble point. It is a further object of the invention to provide a high-pressure vaporization process of secondary recovery wherein the driving gas employed will not by-pass the reservoir oil through zones of the reservoir which are under high free-gas saturation. These and further objects of the invention will become more apparent from a reading of the following description of the invention.

In accordance with the invention, oil is produced from a reservoir which has been depleted below the bubble point of the hydrocarbon system in the reservoir by an improved high-pressure vaporization process which comprises the following steps: (1) repressuring the reservoir by the injection of a gas through at least one input well until the pressure within the reservoir is at a level corresponding substantially with the original saturation pressure of the reservoir oil, or in other words, raising the pressure of the reservoir to about the bubble point of the original hydrocarbon system in the reservoir; (2) when the reservoir pressure has reached approximately the bubble point, injecting into the reservoir through the injection well a quantity of fluid material which is miscible both with the reservoir oil and the repressuring gas; (3) continuing the injection of gas into the reservoir through the input well until the pressure of the reservoir is sufficiently high that light hydrocarbons from the reservoir oil will be vaporized into the driving gas and some of the driving gas will go into solution into the reservoir oil; (4) continuing the injection of driving gas at the pressure attained in the previous step; and (5) recovering oil from the reservoir through at least one production well.

Previous to the inauguration of the process of the invention, the reservoir being produced will have undergone pressure depletion to a degree that the pressure within the reservoir will be below the original saturation pressure or bubble point pressure for the particular hydrocarbon system in the reservoir. In other words, the reservoir will have been produced by primary methods until the formation has gone from a condition of substantial freedom from free-gas saturation and substantial complete saturation or undersaturation of the reservoir oil to a point at which substantial free-gas saturation does exist within the formation of the reservoir, which point is below the bubble point pressure for the hydrocarbon system within the reservoir. For example, the bubble point pressure for the oil within the reservoir may be about 3000 p.s.i. gauge or higher, while the reservoir has been produced by solution-gas drive until the reservoir oil pressure has been lowered to the range of 1500 to 2000 p.s.i. gauge. If the reservoir has been produced to the point where the pressure within the reservoir is approximately 1500 p.s.i. gauge, the first step in the process of the present invention is initiated by introducing a gas into the reservoir through at least one injection well at a pressure in excess of 1500 p.s.i. gauge. The gas which is introduced is preferably a hydrocarbon gas which is substantially free of condensable hydrocarbons. It may be a hydrocarbon gas which comprises substantially methane. The introduction of the hydrocarbon gas in this step of the invention is continued until the pressure within the reservoir has been raised to within a range extending from about 300 p.s.i. below the original bubble point for the reservoir to about 300 p.s.i. above the bubble point. Preferably, the reservoir pressure is raised during this step to a level corresponding to about the original bubble point for the reservoir fluids. This pressure may be about 3000 p.s.i. gauge or higher. The bubble point may also be defined as the saturation pressure for the reservoir oil, or in other words, that pressure at which the introduced gas will begin to go into solution with the reservoir oil. The original bubble point pressure may be readily ascertained by conventional pressure-volume-temperature tests conducted with a sample of the reservoir fluids as they existed when primary production of the reservoir first began. Such a test comprises reducing the pressure on a sample of original reservoir fluids from the original pressure of the reservoir down to the point when free gas is first liberated from solution with the oil.

Subsequent to the reservoir pressure's reaching the above-stated level which may be within the range extending from 300 p.s.i. below to 300 p.s.i. above the bubble point and preferably is about the bubble point, the second step of process of the invention is initiated.

The second step of the process comprises injecting through the input well or wells a predetermined quantity of material which is miscible both with the reservoir oil and the repressuring gas being introduced in accordance with the first step of the invention. This material preferably is a liquefied, normally gaseous hydrocarbon material such as liquefied petroleum gas, better known as LPG. The material injected in this step may also be a hydrocarbon material such as light naphthas. The quantity of liquefied hydrocarbon material introduced may range up to about 1 percent of the pore volume of the reservoir to be swept by the process of the invention and preferably is within the range of about .05 percent to about 0.5 percent of the hydrocarbon pore volume. While the criterion for the introduction of the liquefied hydrocarbon material in this step of the process is the arrival of the reservoir pressure at the level indicated above, it will be recognized that the bubble point may under some reservoir conditions exist at a pressure which may range anywhere from 3000 p.s.i. gauge to 6000 p.s.i. gauge. During the introduction of the liquefied hydrocarbon material, the injection of the hydrocarbon gas of the first step is continued to provide a steady increase in pressure within the reservoir. Immediately upon entry into the formation of the liquefied hydrocarbon material of this step of the invention, the material establishes an oil bank around the injection well, or in other words, it forms a band of oil around the injection well which prevents the hydrocarbon gas by-passing reservoir oil by moving through the zones of the formation of high free-gas saturation. The thus established oil bank around the injection well will continue to exist and prevent by-passing by the injection gas until such time as the desired effects of high-pressure vaporization are attained.

Subsequent to the completion of the injection of the liquefied hydrocarbon material of the second step, the injection of hydrocarbon gas which is substantially free of condensable hydrocarbons is continued to increase the pressure of the formation to the level required for high-pressure vaporization of the light hydrocarbons of the reservoir oil. The desired pressure for carrying out this step of the invention lies within the range above the original bubble point for the hydrocarbon system of the reservoir and below the cricondenbar for the hydrocarbon system. Generally, the pressure for this step is within the range of about 1000–2000 p.s.i. above the bubble point. The term "cricondenbar" as used herein is the highest pressure at which a mixture of the reservoir oil and the injection gas may exist in two phases at reservoir temperature. The cricondenbar may be determined by conventional procedures as shown, for example, in U.S. Patent 2,724,438 to L. P. Wharton et al. The pressure at which high-pressure vaporization sets in may range from about 4000 p.s.i. gauge to 8000 p.s.i. gauge or higher. When the formation pressure due to continued injection of the hydrocarbon gas reaches this upper pressure range at which high-pressure vaporization sets in, some of the gas dissolves within the reservoir oil and some of the oil vaporizes into the gas; and this process continues until an equilibrium is established, at which point there exists a phase between the gas being injected and the reservoir oil, which phase is completely miscible with both the injection gas and the reservoir oil.

Subsequent to the establishment of a pressure within the reservoir sufficient for high-pressure vaporization, the injection of the driving gas is continued to force the miscible phase established by high-pressure vaporization through the reservoir toward the production well or wells. The high-pressure vaporization continues with fresh oil being constantly contacted, components of the fresh oil vaporizing into the gas, some of the gas going into solution in the fresh oil, with complete miscible phase displacement being achieved.

With the establishment of the miscible phase within the reservoir, the injection of the hydrocarbon-driving gas is continued and residual reservoir oil is produced through one or more production wells to which the oil is driven by the driving gas and miscible phase established by the high-pressure vaporization process. Production may continue until the effluent flowing from the production well or wells comprises substantially the driving gas.

While the primary advantage of the introduction of the liquefied hydrocarbon material at the bubble point pressure during the repressuring of the reservoir resides in this material's establishing a band of oil around the injection well which will effectively prevent by-passing of the injection gas through zones of free-gas saturation in the reservoir, the liquefied hydrocarbon material injected in the second step of the process also has the additional feature of providing an oil bank of sufficient size to supply the high-pressure driving gas with the intermediates required to establish its own miscible bank through the high-pressure vaporization process. Also, the injected liquefied hydrocarbon material itself provides a small supply of intermediates which are vaporized and helps supply miscibility in the high-pressure vaporization process. It will be recognized that the liquefied hydrocarbon material introduced in the second step of the process will gradually be dissipated by dilution to the extent that it no longer acts as a miscible slug itself, though by the time this occurs a miscible phase will have been established by virtue of high-pressure vaporization.

While the invention has been discussed in the light of certain specific embodiments disclosed herein, it is to be understood that such description has been given only by way of illustration and example, not by way of limitation, reference for the latter purpose being had to the appended claims.

What is claimed is:

1. In a method of producing oil from a subterranean reservoir which has been produced by primary production methods until the pressure within said reservoir is below the bubble point for the hydrocarbon mixture existing within said reservoir at the initiation of said primary production methods whereby said reservoir includes portions having free-gas saturation, said reservoir being penetrated by at least one injection well and one production well, the steps which comprise:

injecting into said reservoir through said injection well a hydrocarbon gas at a pressure and for a time sufficient to raise the pressure within said reservoir to within a range extending from a minimum of about 300 p.s.i. below said bubble point to a maximum of about 300 p.s.i. above said bubble point;

introducing into said reservoir through said injection well a predetermined quantity of liquefied hydrocarbon material to establish an oil band around said injection well within said reservoir, said hydrocarbon material being introduced when the pressure within said reservoir is within a range extending from a minimum of about 300 p.s.i. below said bubble point to a maximum of about 300 p.s.i. above said bubble point;

subsequent to the introduction of said hydrocarbon material, continuing injection of said hydrocarbon gas until the pressure within said reservoir is raised to within a range extending from a minimum of about said bubble point to a maximum of the cricondenbar for a mixture of said hydrocarbon gas and the oil within said reservoir to effect the establishment of a phase within said reservoir miscible with both the oil in said reservoir and the said hydrocarbon gas whereby said oil will be displaced through said reservoir toward said production well; and producing oil from said reservoir through said production well.

2. In the method of claim 1 wherein the quantity of liquefied hydrocarbon material being introduced into said reservoir through said injection well is less than about 1 percent of the hydrocarbon pore volume of the portions of said reservoir to be swept by said method.

3. In the method of claim 1 wherein the quantity of liquefied hydrocarbon material being introduced into said reservoir through said injection well is within the range of about .05 to 0.5 percent of the hydrocarbon pore volume of the portions of said reservoir to be swept by said method.

4. In a method of producing oil from a subterranean reservoir which has been produced by primary production methods until the pressure within said rservoir is below the bubble point for the hydrocarbon mixture existing within said reservoir at the initiation of said primary production methods whereby said reservoir includes portions having free-gas saturation, said reservoir being penetrated by at least one injection well and one production well, the steps which comprise:

injecting into said reservoir through said injection well a hydrocarbon gas at a pressure and for a time sufficient to raise the pressure within said reservoir to approximately said bubble point;

introducing into said reservoir through said injection well a predetermined quantity of liquefied hydrocarbon material to establish an oil band around said injection well within said reservoir, said hydrocarbon material being introduced when the pressure in said reservoir is about at said bubble point;

subsequent to the introduction of said hydrocarbon material, continuing the injection of said hydrocarbon gas until the establishment by high-pressure vaporization of a phase miscible with both the oil in said reservoir and said hydrocarbon gas whereby said oil will be displaced through said reservoir toward said production well; and producing oil from said reservoir through said production well.

5. In the method of claim 4 wherein the quantity of liquefied hydrocarbon material being introduced into said reservoir through said injection well is less than about 1 percent of the hydrocarbon pore volume of the portions of said reservoir to be swept by said method.

6. In the method of claim 4 wherein the quantity of liquefied hydrocarbon material being introduced into said reservoir through said injection well is within the range of about .05 to 0.5 percent of the hydrocarbon pore volume of the portions of said reservoir to be swept by said method.

7. In a method of producing oil from a subterranean reservoir which has been produced by primary production methods until the pressure within said reservoir is below the bubble point for the hydrocarbon mixture existing within said reservoir at the initiation of said primary production methods whereby said reservoir includes portions having free-gas saturation, said reservoir being penetrated by at least one injection well and one production well, the steps which comprise:

introducing into said reservoir through said injection well a hydrocarbon gas to repressure said reservoir until the pressure within said reservoir is substantially equal to said bubble point;

introducing into said reservoir through said injection well a predetermined quantity of liquefied hydrocarbon material when said reservoir is at a pressure substantially equal to said bubble point to establish around said injection well a hydrocarbon phase miscible with both the oil in said reservoir and said hydrocarbon gas to inhibit the flow of said hydrocarbon gas through zones of said reservoir of free-gas saturation;

continuing the injection of said hydrocarbon gas at a pressure in excess of said bubble point and below the cricondenbar for a mixture of the oil in said reservoir and said hydrocarbon gas at reservoir temperature to effect high-pressure vaporization of intermediate hydrocarbons from said oil and drive a portion of said hydrocarbon gas into solution with said oil to establish a hydrocarbon phase within said reservoir miscible with both said oil and said hydrocarbon gas to displace said oil through said reservoir to said production well; and producing said oil from said reservoir through said production well.

8. In the method of claim 7 wherein the predetermined quantity of liquefied hydrocarbon material introduced into said reservoir through said injection well is less than about 1 percent of the hydrocarbon pore volume of the portions of said reservoir to be swept by said method.

9. In the method of claim 7 wherein the predetermined quantity of liquefied hydrocarbon material introduced through said injection well into said reservoir is within the range of .05 to 0.5 percent of the hydrocarbon pore volume of the portions of said reservoir to be swept by said method.

10. In a method of producing oil from a subterranean reservoir which has been produced by primary production methods until the pressure within said reservoir is below the bubble point for the hydrocarbon mixture existing within said reservoir at the initiation of said primary production methods whereby said reservoir includes portions having free-gas saturation, said reservoir being penetrated by at least one injection well and one production well, the steps which comprise:

introducing into said reservoir through said injection well a hydrocarbon gas until the pressure within said reservoir has been raised to a level substantially equal to said bubble point;

introducing into said reservoir through said injection well a predetermined quantity of liquefied hydrocarbon material to effect a hydrocarbon phase around said injection well to establish an oil band around said injection well by coaction with the oil in said reservoir to inhibit the by-passing of said hydrocarbon gas around said oil through said portions of said reservoir of high free-gas saturation;

continuing the injection of said hydrocarbon gas through said injection well into said reservoir at a pressure sufficient to establish a pressure level within said reservoir, said pressure level being within the range of about 1000–2000 p.s.i. above said bubble point, to effect high-pressure vaporization of intermediate hydrocarbons from said oil and drive a portion of said hydrocarbon gas into solution with said oil to establish a phase within said reservoir miscible both with said oil and said hydrocarbon gas to effect displacement of said oil through said reservoir toward said production well; and producing oil from said reservoir through said production well.

11. In the method of claim 10 wherein the predetermined quantity of liquefied hydrocarbon material is less than about 1 percent of the hydrocarbon pore volume of the portions of said reservoir to be swept by said method.

12. In the method of claim 10 wherein the predetermined quantity of liquefied hydrocarbon material being introduced through said injection well into said reservoir is within the range of .05 to 0.5 percent of the hydrocarbon pore volume of the portions of said reservoir to be swept by said method.

References Cited in the file of this patent

UNITED STATES PATENTS

| 2,724,437 | Whorton et al. | Nov. 22, 1955 |
| 2,724,438 | Whorton et al. | Nov. 22, 1955 |

OTHER REFERENCES

Gibbon, G.: "Injected Liquid Propane Boosts Oil Production," World Oil, May 1957, pp. 92–93.